US012805456B2

(12) United States Patent
Junghage

(10) Patent No.: US 12,805,456 B2
(45) Date of Patent: Nov. 24, 2026

(54) EDGING STONE SECURING DEVICE

(71) Applicant: LocStone AB, Kil (SE)

(72) Inventor: Anders Junghage, Kil (SE)

(73) Assignee: LOCSTONE AB, Kil (SE)

( * ) Notice: Subject to any disclaimer, the term of this patent is extended or adjusted under 35 U.S.C. 154(b) by 239 days.

(21) Appl. No.: 18/421,903

(22) Filed: Jan. 24, 2024

(65) Prior Publication Data

US 2024/0251720 A1 Aug. 1, 2024

(30) Foreign Application Priority Data

Jan. 26, 2023 (SE) .................................... 2350070-5

(51) Int. Cl.
*A01G 9/28* (2018.01)

(52) U.S. Cl.
CPC ...................................... *A01G 9/28* (2018.02)

(58) Field of Classification Search
CPC ................................ A01G 9/28; E01C 11/221
See application file for complete search history.

(56) References Cited

U.S. PATENT DOCUMENTS 1,073,669 A * 9/1913 Fargo .................... E01C 11/221 211/88.01
5,073,061 A * 12/1991 Jones .................... E01C 11/221 404/8
5,212,917 A 5/1993 Kurtz et al.
5,421,118 A * 6/1995 Bauer ...................... A01G 9/28 47/33
5,487,623 A * 1/1996 Anderson ............... E04C 1/395 405/262
5,769,562 A * 6/1998 Jones ................ E04F 15/02005 52/100
5,993,107 A 11/1999 Bauer
6,085,458 A 7/2000 Gau
6,379,078 B1 4/2002 Zwier
9,043,960 B2 6/2015 Ballard
10,480,149 B1 * 11/2019 Abbas ................. E02D 29/0241
(Continued)

FOREIGN PATENT DOCUMENTS

DE 102007044694 A1 * 4/2009 ............ E01C 11/221
FR 2966848 A1 5/2012
(Continued)

OTHER PUBLICATIONS

Office Action dated Apr. 16, 2025; Swedish Patent Application No. 2451277-4. 8 pages.
(Continued)

*Primary Examiner* — Theodore V Adamos
(74) *Attorney, Agent, or Firm* — McDonald Hopkins LLC

(57) ABSTRACT

The present disclosure relates to an edging stone securing device for edging stones positioned intermediate a rain bed and a ground surface, comprising a first plate a second plate having a different orientation relative the first plate and a connection element extending in a first direction. The connection element is arranged to, at a mounted state, be fitted intermediate a first and a second edging stone, allowing for the edging stones to be positioned intermediate said first and second plate, the first and the second plate, being arranged to, in said mounted state, jointly support said first and second edging stones in said first direction.

16 Claims, 9 Drawing Sheets

(56) References Cited

U.S. PATENT DOCUMENTS

| | | | | |
|---|---|---|---|---|
| 11,598,109 | B1 * | 3/2023 | Rostron | E04G 21/1875 |
| 2009/0232597 | A1 | 9/2009 | Zwier et al. | |
| 2015/0252532 | A1 | 9/2015 | Alfieri, III | |
| 2019/0327915 | A1 | 10/2019 | Bahler | |
| 2021/0269988 | A1 | 9/2021 | Jones | |

FOREIGN PATENT DOCUMENTS

| | | | | | |
|---|---|---|---|---|---|
| IT | 201800001870 | A1 | | 7/2019 | |
| KR | 200440717 | Y1 | * | 6/2008 | E01C 11/221 |
| KR | 20140011016 | A | * | 1/2014 | E01C 11/221 |
| KR | 20160066330 | A | * | 6/2016 | E01C 11/22 |
| KR | 101871206 | B1 | | 6/2018 | |
| KR | 102187133 | B1 | * | 12/2020 | E01C 19/52 |
| WO | WO-2019145986 | A1 | * | 8/2019 | E01C 7/00 |
| WO | WO-2023118909 | A1 | * | 6/2023 | E01C 11/221 |

OTHER PUBLICATIONS

Extended European Search Report for Application 23210656.7, dated Jun. 26, 2024, 9 pgs., European Patent Office, Germany.

Office Action, SE Appln. No. 2350070-5; Sep. 22, 2023. 8 pages.

* cited by examiner

EDGING STONE SECURING DEVICE

CROSS-REFERENCE TO RELATED APPLICATIONS

This application claims priority to Swedish Patent Application No. 2350070-5, filed on Jan. 26, 2023, the disclosure of which is herein incorporated by reference in its entirety for all purposes.

TECHNICAL FIELD

The present disclosure relates to an edging stone securing device, an edging stone arrangement, a rain bed system and a method for securing adjacent edging stones to a surface.

BACKGROUND

The long term heating of Earth's surface, also referred to as global warming, has several implications for the earth. One of the implications is extreme weather, which comprise downpour. To be able to handle downpour in cities, the cities need solutions to handle the rainwater.

A solution for handling such is to utilize rain beds, which comprise an enclosed area of plants/soil that delay the transferring of the rainwater to the underground and/or filter the rainwater. Such rain beds are often in direct connection to busy roads. The frame enclosing the enclosed area of the rain beds comprises edging stones. The edging stones serve a function to delimit the enclosed area from the road and to serve as an indicator for vehicles at the road. If the edging stones are not properly attached to their position, during heavy rain fall, the edging stones may tilt/fall towards the rain bed as the rain bed gets softened by the rain. Then, they are not able to fulfil their purpose. This issue may also occur if vehicles/pedestrians apply a force, by collision or operation (e.g. a plow truck forcing snow towards the edging stones to clear the road), to the outer surface of the edging stones.

Conventionally, to avoid the edging stones from tilting/falling into the rain bed, the edging stones are casted in-between the road and the rain bed. A drawback with this is that by casting the inner part of the edging stone, which is directed towards the rain bed, the area of the soil/plats are reduced. Also, as this requires an excessive use of material, which is both costly, time-consuming to implement and damaging towards the environment.

Thus, in the present art, there are no solutions for efficiently securing edging stones to a surface. Specifically, securing edging stones positioned intermediate a rain bed and a solid surface.

Hence, there are room for arrangements, methods and devices in the present art to explore the domain of providing improved arrangements, methods and devices. Especially, there is room to provide such, that are improved in convenience when being installed, improved in environmental aspects and/or in cost efficiency. Thus, even though previous solutions may work well in some situations, it would be desirable to provide a solution that address requirements related to efficiency, especially in installing efficiency, cost efficiency and/or environmental aspects.

SUMMARY

It is therefore an object of the present disclosure to alleviate at least some of the mentioned drawbacks to provide an improved, device, arrangement, rain bed and method.

This and other objects, which will become apparent in the following, are achieved by a device, arrangement, rain bed and a method as defined in the appended claims.

The present disclosure relates to an edging stone securing device for edging stones positioned intermediate a rain bed and a solid/ground surface (e.g. an asphalted/composite road or any other type of road for vehicles or pedestrians). In other words, for edging stones functioning as a frame for delimiting the rain bed from a solid surface such as a road. It should be noted that the edging stone securing device is also suitable for being positioned between two ground surfaces. The device comprising a first plate, a second plate having a different orientation relative the first plate and a connection element extending in a first direction. The first plate and the second plate may be in the form of polygonal (e.g. rectangular) sheets. The connection element comprises a first end portion and an opposite/opposing second end portion, wherein the first plate is attached to said first end portion and the second plate is attached to said second end portion (or vice versa). The connection element is arranged to, at a mounted state, be fitted intermediate a first and a second edging stone, allowing for the edging stones to be positioned intermediate said first and second plate, wherein the first and the second plate are arranged to jointly support said first and second edging stones in said first direction. The mounted state may be a state in which one of the first and second plate is secured to ground (surface of a road for example), e.g. by casting, fastening elements or any other means. In some aspects the device may be arranged to be positioned intermediate a rain bed and a solid surface thereby delimiting the surface from the rain bed. The connection element 4 may extend beyond the full thickness of the first and second edging stones, when fitted therebetween at said mounted state.

An advantage of the device is that two edging stones can be anchored intermediate a solid surface and a rain bed to provide a frame structure delimiting the rain bed from the solid surface without the use of excessive cement or any other anchoring material. Instead, one of the plates is arranged to be secured to the solid surface. Consequently, the cooperative connection/orientation between the first and the second surface secures the edging stones.

The first plate may form an angle of 75-105 degrees relative said second plate, preferably 80-100 degrees, more preferably 85-95 degrees, more preferably 88-92 degrees, or 90 degrees (substantially perpendicular) relative the second plate.

Such an orientation of the plates relative each other allow for one of the plates to be parallel with a vertically (when mounted) extending side of the stone and the other one may be at least partially parallel or similarly oriented as the solid surface. Accordingly, at said mounted state, it is enough for the plate parallel with the solid surface, then the other plate will prevent the edging stone from tilting/falling/slanting/tipping/rolling/tumbling over the rain bed.

Hence, in some aspects herein, the second plate is arranged to, at said mounted state, be parallel to, and in contact with a vertically extending inner surface of at least one of said edging stones for supporting said edging stones in said first direction for preventing the edging stones from tilting/falling towards the rain bed. The vertically extending inner surface may be the surface of the stone that is oriented towards the rain bed, wherein the opposing outer surface is oriented away from the rain bed. The contact between the inner surface and the second plate may be direct and/or indirect.

Moreover, said first plate may be arranged to, at said mounted state, be attached to a ground surface. Preferably, the first plate may be arranged to be attached under a ground surface, i.e. under or at least partially under the ground material of the road. In other words, the first plate may be arranged to be embedded in a solid surface/ground surface.

At an aspect of the device herein in which the second plate is arranged to be parallel to, and in contact with a vertically extending inner surface of at least one of said edging stones for supporting said edging stones in said first direction for preventing the edging stones from rolling over or into the area enclosed by the rain bed, and the first plate is arranged to be attached to a ground surface. The first plate will prevent the second plate from moving in the first direction (towards the rain bed) and the second plate will prevent the edging stones to be tilted/fall inside a rain bed.

The first plate may comprise at least one through hole, preferably 2-8 through holes. Each through hole may have a radius of at least 10 mm or at least 20 mm or at least 30 mm.

An advantage of having through holes in the first plate is that, if said first plate is embedded to the solid surface. An embedding material, which may be the same as the material of the solid surface, (e.g. asphalt and/or concrete) may be poured/paved over the first plate at a liquid state. Hence, the embedding material will penetrate the through holes and the first plate will be anchored in a more secure manner to said ground after the material has dried/solidified.

The first plate may comprise an edge that attached to (by fastening elements, soldering or any other attachment means) said first end portion of said connection element. Thus, the first plate may be or define an extension of the connection element in the first direction.

In some aspects, the connection element comprises, at said first end portion, a cavity extending in said first direction, wherein an edge of said first plate is accommodated by, and secured to said cavity. An advantage of such a fastening of the first plate to said connection element is that the first plate is less sensitive to forces in a direction perpendicular to the first direction, thereby the first plate will be properly secured to the connection element.

The connection element may at its second end portion be attached to an intermediate portion of said second plate. The connection element attached to an edge of the first plate and an intermediate of the second plate allows for the first and second plate to have different orientations relative each other. Moreover, by being attached to an intermediate portion of said second plate, the second plate may be supporting the edging stones more rigidly.

The second plate may comprise a first part and a second part, at least one of the parts being adjustable along said first direction for compensating thickness variations of the first edging stone relative the second edging stone. Thus, the second plate may be supporting/being in contact with both stones even though they have different thicknesses. The adjustability may be performed by a pawl mechanism, through fastening means, clamps or any other type of adjustment means.

The connection element may be an oblong sheet extending in the first direction. In some aspects the connection element may be a shaft like structure. However, it should be noted that even though the connection element has a general extension in the first direction it may have varying forms such as a meandering form extending in the first direction. In other aspects the connection element may have two (integral) sections extending towards the first direction. The first section having an angle (of 5-45 degrees) relative the other section, in other words forming two "lines" extending in the first direction wherein the first line have an angle relative the second, one line may extend in the first direction, the other may have said angle relative the first direction.

The first plate have a width and height of 7-15 cm, or 5-25 cm or 5-40 cm. The second plate may have a width and height of 7-15 cm, or 5-25 cm or 5-40 cm. The thickness of the plates may be 1-10 or 1-25 mm. The material of the plates/connection elements may be metal, iron or any other suitable material.

The thickness of the connection element may be 5-12 mm, preferably 6-10 mm. Most preferably 8 mm. The connection element may have a width of 30-90 mm. The width may be arranged to extend along the height of the edging stone. Moreover, the length of the connection element may be 10 cm-1 m, preferably 20 cm-80 cm.

The device may be arranged to secure edging stones in the form of cuboids with a height of 12 cm. The connection plate may inserted intermediate sides of adjacent cuboids, in which the sides faces each other. Then, the connection plate may be arranged to be secured inbetween/intermediate said sides by a joint compound.

The connection element comprises a length being greater than a thickness, in said first direction, of any one of the pair of edging stones said connection element is adapted to be inserted in-between.

There is also provided an edging stone arrangement comprising a first and a second edging stone and an edging stone securing device in accordance with any one of the preceding claims, wherein the connection element is, at said mounted state, fitted intermediate said first and second edging stone, allowing for the edging stones to be positioned intermediate said first and second plate.

The edging stone securing device may correspond to the edging stone securing device in accordance with any aspect herein.

The first and second edging stone may be arranged to be partially embedded/inserted in a surface in-between a solid surface (e.g. concrete/asphalt) and a rain bed. Further, the first plate is arranged to be secured to the solid surface.

A rain bed system comprising a water receiving area for preventing flooding and/or transferring water to an underground at a slow rate (comprising soil/plants), the water receiving area being at least partially enclosed by a plurality of edging stones, wherein an edging stone securing device in accordance with any one of the preceding claims is fitted in-between at least one pair of adjacent edging stones of said plurality of edging stones, wherein said second plate is in contact with at least one inner surface of a pair of corresponding edging stones, and each first plate is secured to a solid surface associated to an outer surface of said corresponding edging stones. Associated to may refer to that the solid surface is delimited by the edging stone. Moreover, the edging stone may delimit the rain bed.

The stones may be embedded/inserted at a surface portion in-between the solid surface and the water receiving area.

An advantage of the rain bed system in accordance with the present disclosure is that the edging stones may be properly secured to form a frame surrounding the water receiving area in a manner that is space efficient, thereby maximising the water receiving area to be able to absorb more water. The rain bed may have an inlet for receiving area from outside the rain bed. The inlet may be in the form of an opening in the stones or formed by a space in between a pair of stones.

There is also provided a method for securing adjacent edging stones to a surface comprising providing an edging stone securing device in accordance with any aspect herein, inserting said connection element of said edging stone securing device in-between said adjacent edging stones so that the first plate is parallel with said surface and the second plate is in contact with (and paralle)l to at least one vertically extending inner surface of at least one of said edging stones. The method further comprises securing said first plate to said surface. The first plate may be secured by fastening means or by embedding it in a material such as concrete or asphalt, and upon drying of said material, the first plate is secured to said surface.

Generally, all terms used in the description are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

These and other features and advantages of the present disclosure will now be further clarified and described in more detail, with reference to the appended drawings.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the present disclosure, it will be apparent to one skilled in the art that the present disclosure may be practiced without these specific details. In other instances, well known constructions or functions are not described in detail, so as not to obscure the present disclosure.'

Figure 1A:
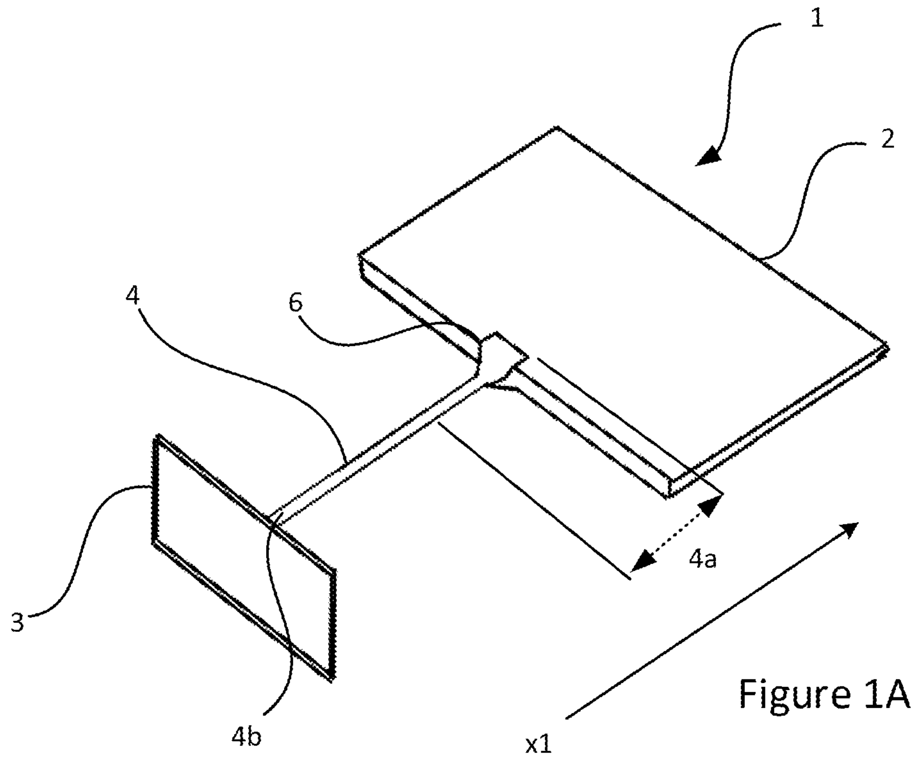
FIG. 1A illustrates an objective view of an edging stone securing device in accordance with some aspects of the present disclosure.

FIG. 1A illustrates an edging stone securing device 1 from a perspective view for edging stones positioned intermediate a rain bed and a solid surface, comprising a first plate 2 a second plate 3 having a different orientation relative the first plate. The term "solid surface" may be interchanged with "ground surface". Further, comprising a connection element 4 extending in a first direction x1, the connection element 4 having a first end portion 4*a* and an opposite second end portion 4*b*, wherein the first plate 2 is attached to said first end portion 4*a* and the second plate 3 is attached to said second end portion 4*b*. FIG. 1A illustrates that an edge 6 of said first plate 2 may be attached to said first end portion 4*a* of said connection element 4 forming an extension of the connection element in the first direction x1.

Figure 1B:
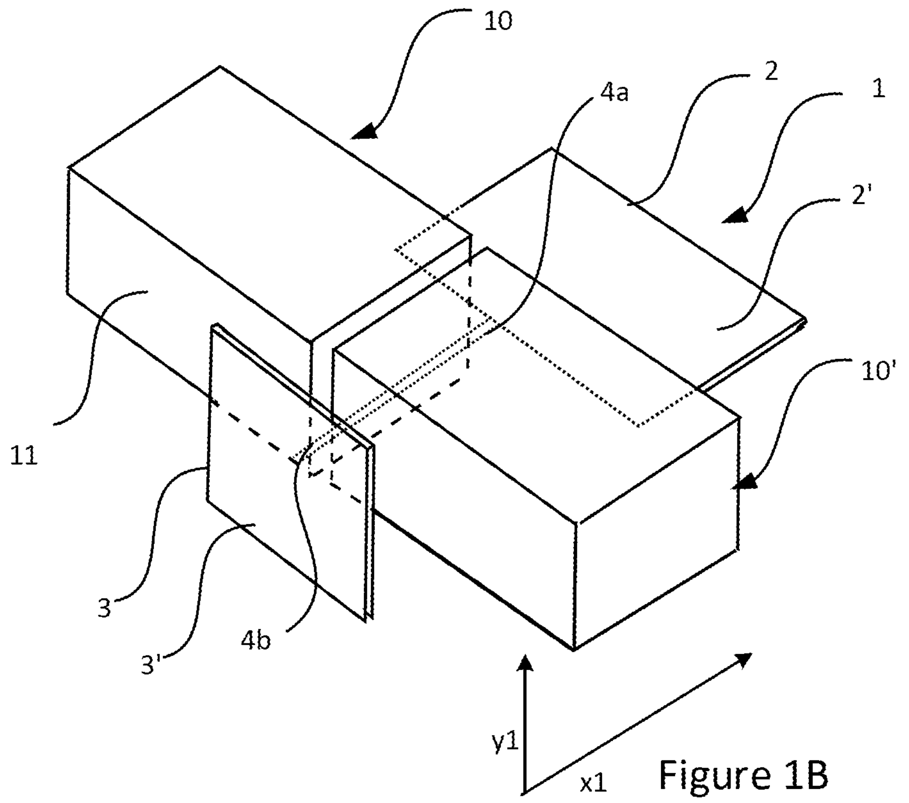
FIG. 1B illustrates an objective view of an edging stone securing device at a mounted/installed state in accordance with some aspects of the present disclosure.

FIG. 1B illustrates the edging stone device at a mounted state, illustrating that the connection element 4 is arranged to, at said mounted state, be fitted intermediate a first and a second edging stone 10, 10', allowing for the edging stones 10, 10' to be positioned intermediate said first and second plate 2, 3, the first and the second plate 2, 3, being arranged to, in said mounted state, jointly support said first and second edging stones in said first direction x1.

The connection element 4 is arranged to, as shown in FIG. 1B, be intermediate adjacent sides of the stones 10, 10'.

As illustrated in FIG. 1B, the plate 3 may support an inner surface of said stone. The plates 2, 3 may be in the form of sheets as illustrated in FIG. 1A-1B. The sheets may be flat and/or corrugated and/or have protrusions.

FIG. 1A-1B illustrates that the first plate 2 and the second plate comprises different orientations. Specifically, FIG. 1B illustrates that the extension surfaces 2', 3' thereof have different orientation relative each other. The extension surface may be substantially (i.e. +−5%) perpendicular relative each other. In other aspects the extension surfaces 2', 3' may form angles of 75-105 degrees relative each other, preferably 80-100 degrees, more preferably 85-95 degrees, more preferably 88-92 degrees. Thereby allowing for one surface 2' to be parallel with ground and one 3' to be parallel with a vertical extension y1 of the stones 10, 10'.

FIG. 1B illustrates that the second plate 3 may be arranged to, at said mounted state which is depicted in FIG. 1B, be parallel to, and in contact with a vertically extending inner surface 11 of at least one of said edging stones 10, 10' for supporting said edging stones 10, 10' in said first direction x1. The inner surface 11 may be referred to as the surface 11 that is arranged to contact/be associated to/facing a receiving area of the rain bed that comprises e.g., soil/plats etc. The term rain bed may refer to an area/structure that is cable to filter storm water runoff from surrounding areas of storm water pipes. The term rain bed may be interchanged with rainwater bed or infiltration bed. The receiving area may comprise a vegetation bed comprising soil. The term rain beds as such may refer to a system comprising an infiltration surfaces that is constructed with the aim of purifying stormwater. The purification of the water takes place by water infiltrating through the receiving surface (which may comprise (bio)filter/soil/plants), whereby pollutants and nutrients are fixed in the filter material, or taken up by plants. FIG. 1B further illustrates that the connection element 4 may at its second end portion 4*b* be attached to an intermediate portion/centre portion of said second plate 3. Thereby, it allows the plate 3 to be supporting two stones 10, 10' simultaneously as illustrated in FIG. 1B.

Figure 2A:
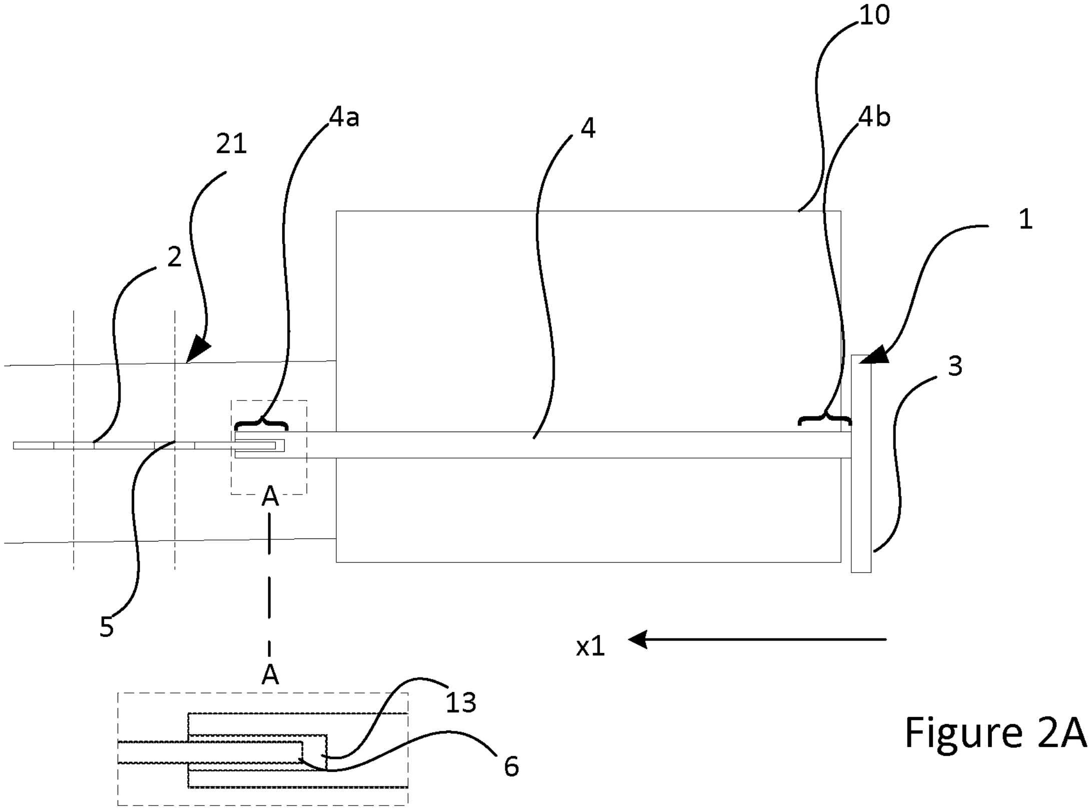
FIG. 2A illustrates a side cross-sectional view of an edging stone securing device at a mounted/installed state in accordance with some aspects of the present disclosure.

FIG. 2A illustrates a side cross-sectional view of an edging stone securing device 1 at a mounted state. FIG. 2A illustrates at an enlarged view A of a part thereof that the connection element 4 comprises, at said first end portion, a cavity 13 extending in said first direction x1, wherein an edge 6 of said first plate 2 is accommodated by, and secured to said cavity. The edge 6 may be secured by fastening elements, adhesive or any other suitable type of securing means.

FIG. 2A illustrates that the first plate 2 is embedded to a solid surface so to jointly, with the second plate 3 secure the stone 10 in the first direction x1. The second plate 3 may be arranged to support the stone in the first direction x1. FIG. 2A further illustrates that the first plate 2 may comprise at least one through hole 5. As illustrated in FIG. 2A the through hole 5 can increase the securing of the plate 2 to the solid surface 21 as the solid surface can penetrate the through holes 2.

Figure 2B:
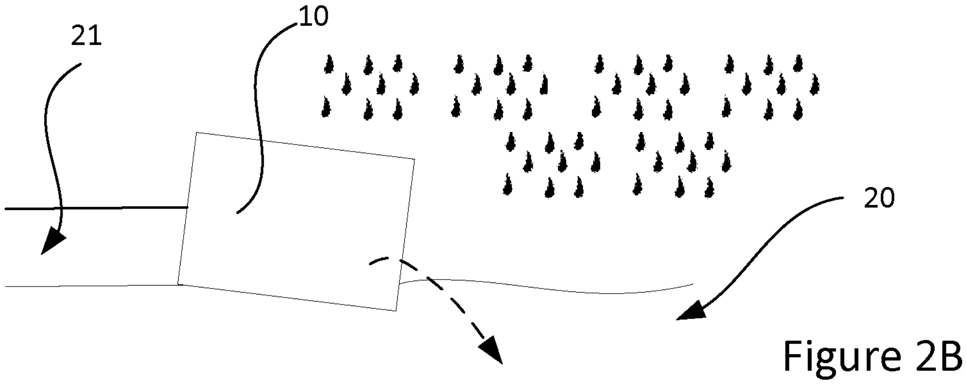
FIG. 2B illustrates a side view of an edging stone.

FIG. 2B illustrates a stone from a side view, in which the stone is intermediate a receiving area 20 of a rain bed and a solid surface 21. As illustrated in FIG. 2B, the stone 10 sinks, as indicated by the arrow, into the softened (by rain) receiving area 20 of the rain bed. Accordingly, the device 1 of the present disclosure solves such problem without reducing the area of the receiving area 20.

Figure 3:
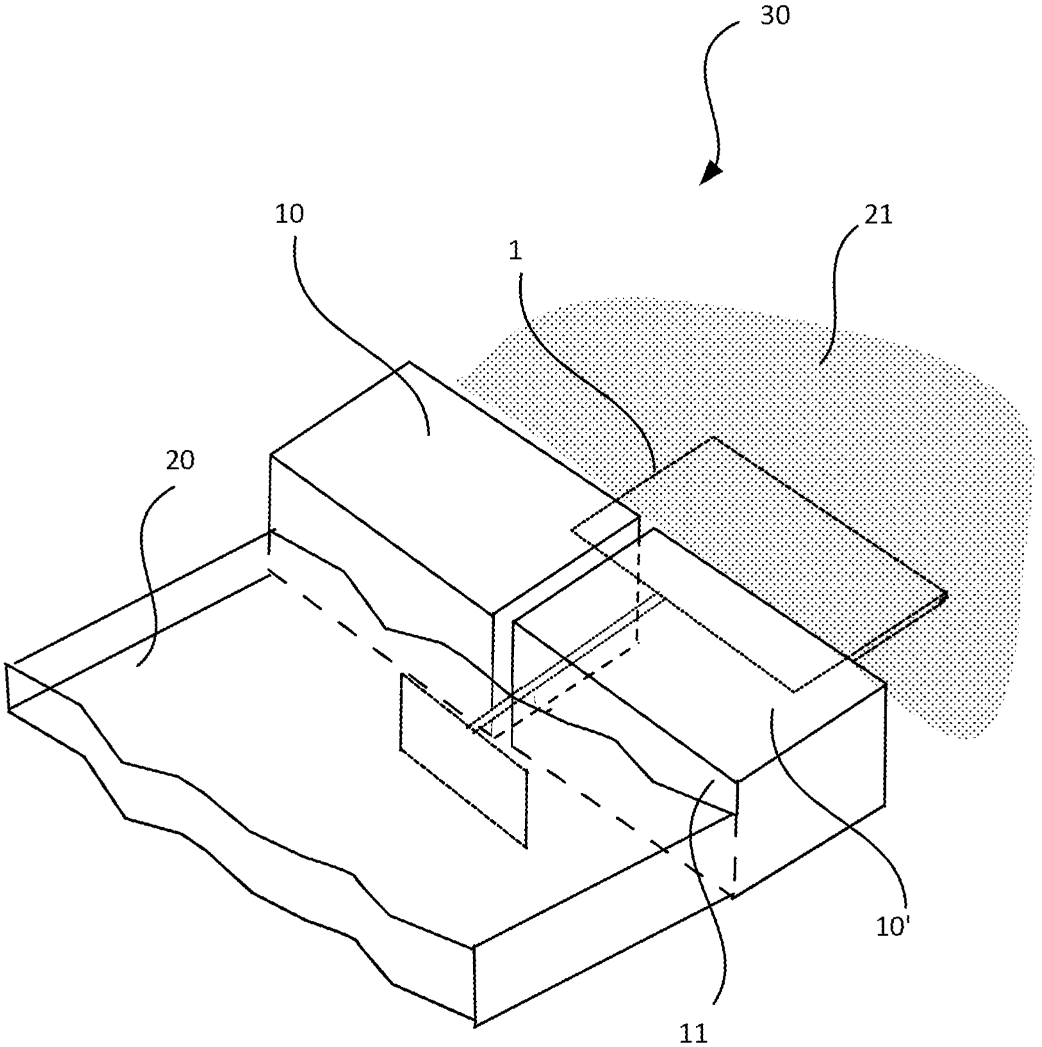
FIG. 3 illustrates an objective view of an edging stone arrangement at a mounted/installed state in accordance with some aspects of the present disclosure, wherein the figure illustrates that the plates are embedded underground.

FIG. 3 illustrates an objective view of an edging stone arrangement 30 comprising a first and a second edging stone 10, 10' and an edging stone securing device 1 in accordance with any aspect herein such as the one shown in FIGS. 1A-1B. The connection element 4 is, at said mounted state, fitted intermediate said first and second edging stone 10, 10', allowing for the edging stones 10, 10' to be positioned intermediate said first and second plate 2, 3. In FIG. 3 the plates are below the surfaces 20, 21. Thus, the device 1 may be hidden, even though it fulfils its function.

Figure 4A:
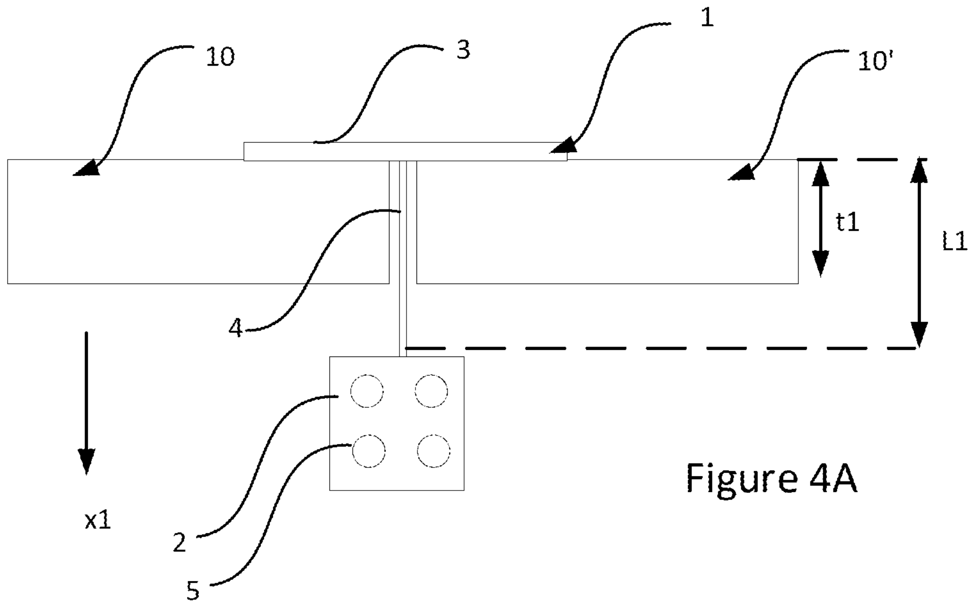
FIG. 4A illustrates a top view of an edging stone securing device at a mounted/installed state in accordance with some aspects of the present disclosure.

FIG. 4A illustrates a top view of the edging stone securing device 1 at a mounted state. As illustrated in FIG. 4A the first plate 5 may comprise a plurality of through holes 5, for example 2-8. As illustrated in FIG. 4A the connection element 4 may have a length L1, the length L1 may be dimensioned to be longer than a thickness t1 of any of the edging stones 10, 10' its inserted inbetween. FIG. 4A also illustrates that the second plate 3 may be in contact with the inner side 11 of the edging stones 10, 10' or one of the edging stones 10, 10' for supporting said edging stones 10, 10'.

Figure 4B:
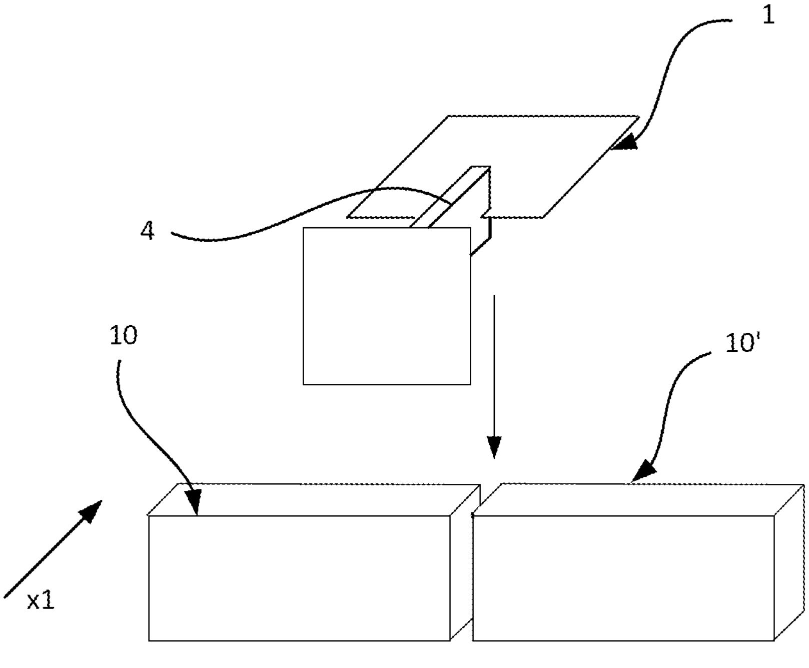
FIG. 4B illustrates an objective view of an edging stone securing device during installing in accordance with some aspects of the present disclosure.

FIG. 4B illustrates an objective view of a edging stone securing device 1 being mounted inbetween a pair of edging stones 10, 10'. As illustrated in FIG. 4B, the device 1 may be placed such that the connection element 4 is sandwiched between facing sides of the stones 10, 10'. Moreover, FIG. 4B illustrates that the connection element 4 may be in the form of a sheet with a thickness and height. The thickness may be less than 25 mm or 15 mm or 10 mm for not taking up excessive space between the stones 10, 10'. After the device 1 is inserted as in FIG. 4B, a jointing material may secure the stones 10, 10' to each other and consequently the connection element 4 to the space inbetween the stones 10, 10' Further, the first sheet 2 may be secured to a solid surface thereby allowing the first sheet 2 and the second sheet 3 to jointly support the stone in the first direction x1. The second sheet 3 may support by acting as a supportive wall towards the vertically extending surface of at least one of the stones 10, 10'.

Figure 5:
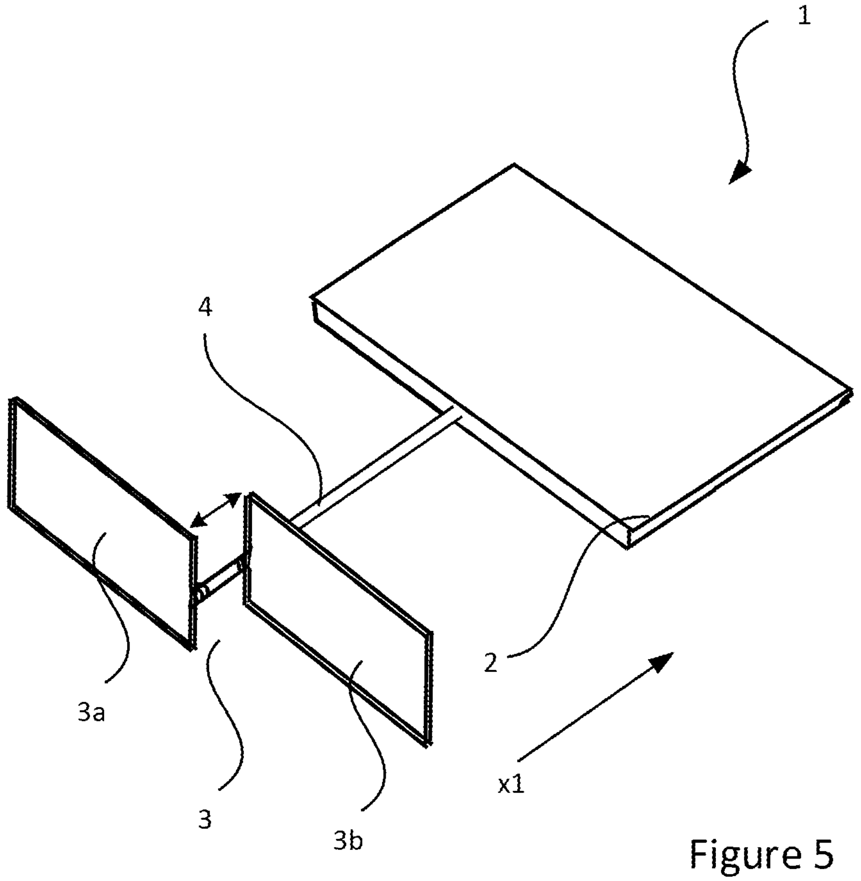
FIG. 5 illustrates an objective view of an edging stone securing device in accordance with some aspects of the present disclosure.

FIG. 5 illustrates an objective view of a device 1 in accordance with some aspects herein. FIG. 5 illustrates that the second plate 3 may comprises a first part and a second part 3*a*, 3*b*, at least one of the parts 3*a*, 3*b* being adjustable along said first direction x1 for compensating thickness variations of the first edging stone 10 relative the second edging stone 10'. Thereby allowing the plate 3 to support both stones 10, 10' even though they have different extensions in the first direction x1.

Figure 6:
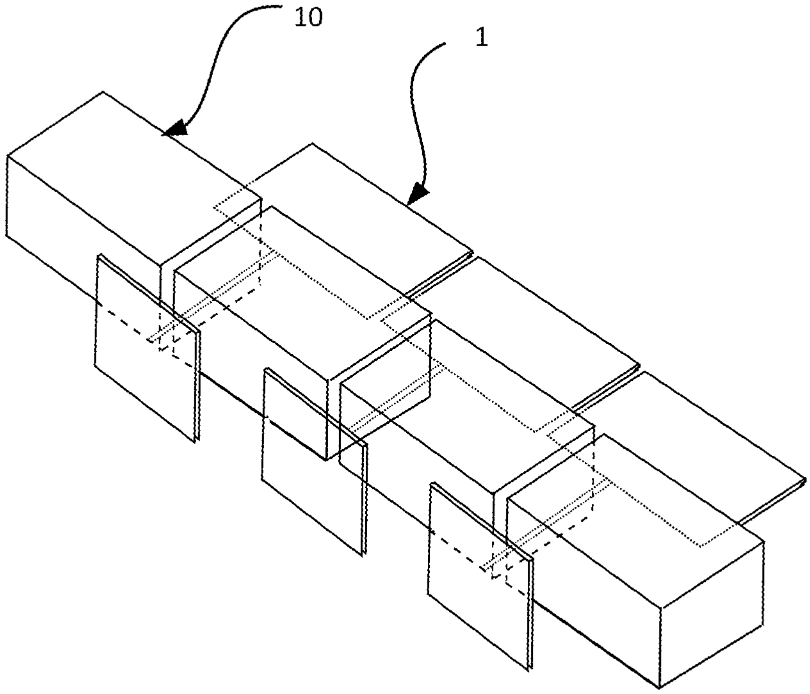
FIG. 6 illustrates an objective view of a plurality of installed edging stone securing devices in accordance with some aspects of the present disclosure.

FIG. 6 illustrates a plurality of stone edging securing devices 1 from an objective view intermediate a plurality of edging stones 1. Accordingly, in a rain bed, there may be a plurality of such devices 1 for supporting as many stones as needed.

Figure 7:
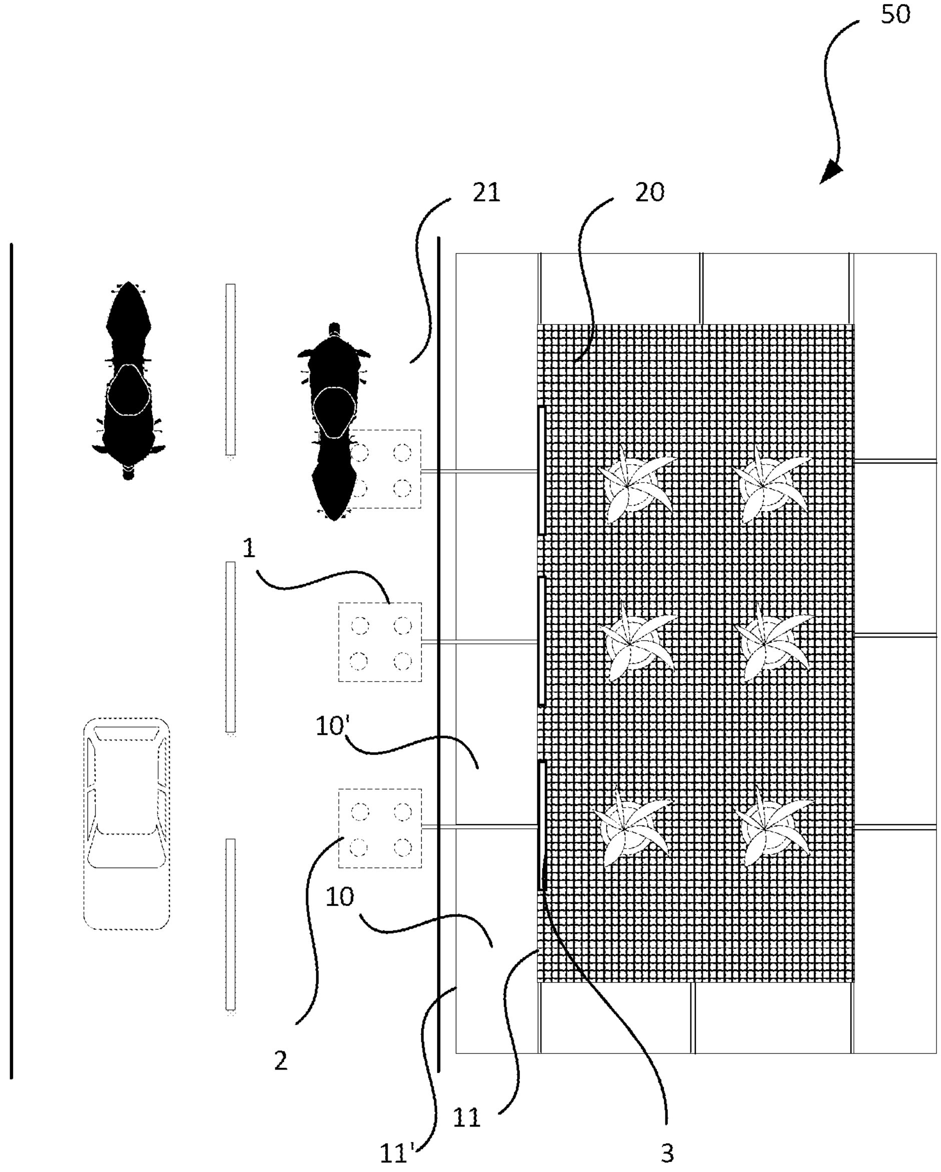
FIG. 7 illustrates a top view of a rain bed system in accordance with some aspects of the present disclosure.

FIG. 7 illustrates a rain bed system 50 from a top view comprising a water receiving area 20, being at least partially enclosed by a plurality of edging stones 10, wherein a connection element 4 of an edging stone securing device 1 in accordance with any one of the preceding claims is fitted in-between adjacent edging stones 10 of said plurality of edging stones 10, wherein said second plate 3 is in contact with at least one inner surface 11 of a pair of adjacent edging stones, and each first plate 2 is secured to a solid surface 21 associated to an outer surface 11' of said adjacent edging stones.

As illustrated in FIG. 7, there may be a plurality of edging stone securing devices 1 in-between a plurality of adjacent stones 10, 10'. The water receiving area 20 may comprise soil. The rain bed system 50 may further comprise an inlet (not shown) for leading storm water from the solid surface to the rain bed system 50. The solid surface may be a road for vehicles. As shown in FIG. 7, the first sheet 2 may be installed to in said mounted state be embedded below the solid surface 21. The second sheet 3 may then be arranged to act as a supportive wall so that any pressure leading the stone 10 towards the area 20 will be biased by the plate 3. The plate 3 may, in said mounted state, according to any aspect herein, be in contact with the vertical extending inner surface 11 of the stone 10 thereby preventing the stone 10 from falling into or tilting towards the receiving area 20.

Figure 8:
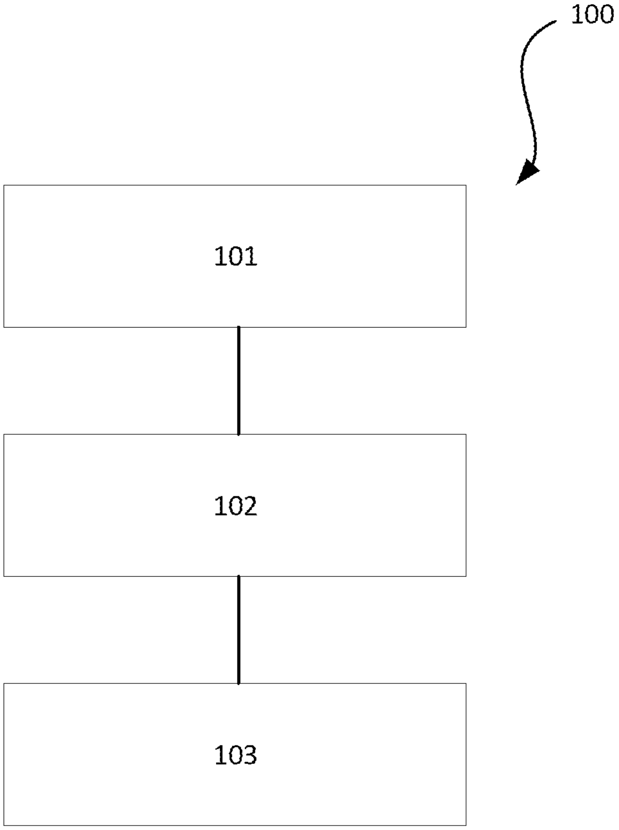
FIG. 8 illustrates a method in the form of a flowchart.

FIG. 8 illustrates a method 100 in the form of a flowchart. Specifically, FIG. 8 illustrates a method 100 for securing adjacent edging stones to a surface. The method comprising providing 101) an edging stone securing device in accordance with any aspect herein. Further, inserting 102 (e.g. as shown in FIG. 4B) said connection element of said edging stone securing device in-between said adjacent edging stones so that the first plate is parallel with said surface and the second plate is in contact with at least one vertically extending inner surface of at least one of said edging stones. Further, the method comprises securing (103) said first plate to said surface.

Figure 9:
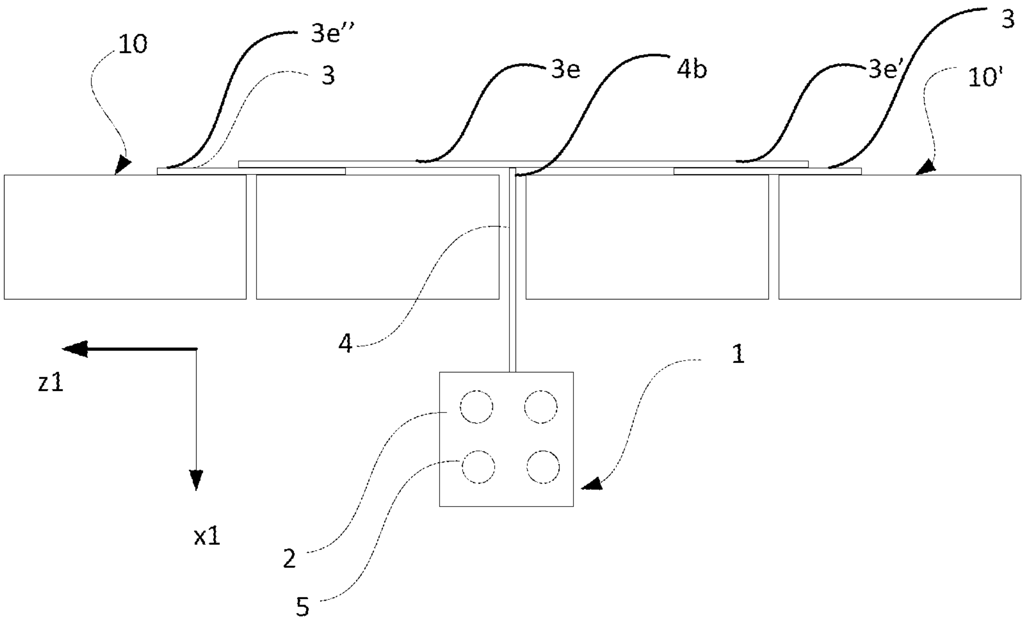
FIG. 9 illustrates a top view of an edging stone securing device comprising several second plates.

FIG. 9 illustrates an aspect of the edging stone securing device 1 in which the device 1 comprises at least an additional second plate 3, the connection element 4 in said aspect comprises at its second end portion 4*b* a horizontally z1 extending spreading element 3*e* (perpendicular to the extension in the first direction x1), wherein one of the second plates are attached to one end 3*e'* of said spreading element 3*e* and the other plate 3 is attached to another opposing end 3*e''* of said spreading element 3*e*. Thereby, the edging stone securing device 1 may span over several edging stones 10. The spreading element 3*e* may be a rod-shaped or sheet shaped structure (e.g. formed as a flat ruler).

What is claimed is:

1. An edging stone securing device for edging stones positioned side-by-side intermediate a rain bed and a ground surface, comprising:

a first plate;

a second plate having a different orientation relative the first plate;

a connection element extending in a first direction, the connection element having a first end portion and an opposite second end portion, wherein;

the first plate is attached to said first end portion and the second plate is attached to said second end portion;

the connection element is arranged to, at a mounted state, be fitted intermediate adjacent sides of a first and a second edging stone, allowing for the edging stones to be positioned intermediate said first and second plate, the first and the second plate being arranged to, in said mounted state, jointly support said first and second edging stones in said first direction, wherein said first plate is arranged to, at said mounted state, be attached to or embedded in said ground surface, and oriented parallel to said ground surface, wherein the connection element has a length being dimensioned to be greater than a thickness of the first and the second edging stone, wherein a distance between the first plate and the second plate is greater than said thickness of the first and the second edging stone in said first direction, wherein, at said mounted state, the first end portion extends beyond the thickness of the first and second edging stone so that the first plate is not in contact with any one of the first and the second edging stone, wherein the length of the connection element is 10 cm-1 m, wherein said second plate, at the second end portion, comprises a first part and a second part, the first part and the second part being spaced from each other along a direction perpendicular to the first direction to support corresponding inner surfaces of said first and second edging stones, at least one of the first and the second part being adjustable relative to another of the first and the second part along the second end portion parallel to said first direction for compensating thickness variations of the first edging stone relative the second edging stone along the first direction.

2. The edging stone securing device according to claim 1, wherein the first plate forms an angle of 75-105 degrees relative said second plate.

3. The edging stone securing device according to claim 2, wherein the angle is 80-100 degrees.

4. The edging stone securing device according to claim 3, wherein the angle is 85-95 degrees.

5. The edging stone securing device according to claim 4, wherein the angle is 88-92 degrees.

6. The edging stone securing device according to claim 1, wherein the second plate is arranged to, at said mounted state, be parallel to, and in contact with a vertically extending inner surface of at least one of said edging stones for supporting said edging stones in said first direction.

7. The edging stone securing device according to claim 1, wherein the first plate comprises at least one through hole.

8. The edging stone securing device according to claim 7, wherein the first plate comprises a plurality of through holes, the at least one through hole is one through hole of the plurality of through holes.

9. The edging stone securing device according to claim 8, wherein the first plate comprises two to eight through holes.

10. The edging stone securing device according to claim 1, wherein an edge of said first plate is attached to said first end portion of said connection element.

11. The edging stone securing device according to claim 1, wherein the connection element comprises, at said first end portion, a cavity extending in said first direction, wherein an edge of said first plate is accommodated by, and secured to said cavity.

12. The edging stone securing device according to claim 1, wherein said second end portion of said connection element is attached to an intermediate portion of said second plate.

13. The edging stone securing device according to claim 1, wherein said connection element is an oblong sheet.

14. An edging stone arrangement comprising a first and a second edging stone and the edging stone securing device of claim 1, wherein the connection element is, at said mounted state, fitted intermediate said first and second edging stone, allowing for the edging stones to be positioned intermediate said first and second plate.

15. A rain bed system comprising a water receiving area, the water receiving area being at least partially enclosed by a plurality of edging stones, wherein the rain bed system comprises at least one edging stone securing device of claim 1, wherein the connection element of the edging stone securing device is fitted in-between adjacent edging stones of said plurality of edging stones.

16. A method for securing adjacent edging stones to a ground surface comprising:

providing the edging stone securing device of claim 1;

inserting said connection element of said edging stone securing device in-between said adjacent edging stones so that the first plate is parallel with said ground surface and the second plate is in contact with at least one vertically extending inner surface of at least one of said edging stones; and securing said first plate to said ground surface.

* * * * *